(12) United States Patent
Kadi et al.

(10) Patent No.: US 10,363,553 B2
(45) Date of Patent: Jul. 30, 2019

(54) NANOCOMPOSITE HOLLOW SPHERE AS A PHOTOCATALYST AND METHODS THEREOF

(71) Applicant: King Abdulaziz University, Jeddah (SA)

(72) Inventors: Mohammad W. Kadi, Jeddah (SA); Reda Mohamedy Mohamed Ouf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 223 days.

(21) Appl. No.: 15/491,490

(22) Filed: Apr. 19, 2017

(65) Prior Publication Data
US 2018/0305294 A1    Oct. 25, 2018

(51) Int. Cl.
| | |
|---|---|
| *B01J 35/00* | (2006.01) |
| *B01J 35/02* | (2006.01) |
| *B01J 35/08* | (2006.01) |
| *B01J 35/10* | (2006.01) |
| *B01J 37/00* | (2006.01) |
| *B01J 37/03* | (2006.01) |
| *B01J 37/08* | (2006.01) |
| *B01J 27/185* | (2006.01) |

(52) U.S. Cl.
CPC ........... *B01J 37/08* (2013.01); *B01J 27/1856* (2013.01); *B01J 35/004* (2013.01); *B01J 35/0013* (2013.01); *B01J 35/08* (2013.01); *B01J 35/1019* (2013.01); *B01J 37/0045* (2013.01); *B01J 37/036* (2013.01); *B01J 35/023* (2013.01)

(58) Field of Classification Search
CPC ................................. B01J 35/004; B01J 35/08
See application file for complete search history.

(56) References Cited

U.S. PATENT DOCUMENTS

| | | | | |
|---|---|---|---|---|
| 5,858,318 A | * | 1/1999 | Luo ................... | C01B 25/325 423/308 |
| 6,010,648 A | * | 1/2000 | Yamamoto .......... | C04B 35/626 264/15 |
| 6,025,034 A | * | 2/2000 | Strutt ................. | B01J 13/02 427/212 |
| 6,235,962 B1 | * | 5/2001 | Zeuthen .............. | B01J 23/63 585/700 |

(Continued)

FOREIGN PATENT DOCUMENTS

| | | |
|---|---|---|
| CN | 1772363 A | 5/2006 |
| JP | 6-1708 A | 1/1994 |

OTHER PUBLICATIONS

Guo et al., Material Letters 63, 2009, 1013-1015 (Year: 2009).*

(Continued)

*Primary Examiner* — Liam J Heincer
(74) *Attorney, Agent, or Firm* — Oblon, McClelland, Maier & Neustadt, L.L.P.

(57) ABSTRACT

A photocatalytic nanocomposite hollow sphere comprising a shell surrounding a hollow core, and the shell comprising zirconium dioxide, hydroxyapatite, and platinum, as well as a method for producing the nanocomposite hollow sphere and a method employing the nanocomposite hollow sphere in reducing an aromatic nitro compound to an aromatic amine compound under visible light are disclosed.

20 Claims, 15 Drawing Sheets

(56) References Cited

U.S. PATENT DOCUMENTS

| | | | |
|---|---|---|---|
| 2002/0162797 A1* | 11/2002 | Johnson | H01F 1/36 210/660 |
| 2005/0064075 A1* | 3/2005 | Wakamura | A23B 4/02 426/106 |
| 2007/0232487 A1* | 10/2007 | Naganuma | B01D 53/885 502/208 |
| 2008/0206554 A1* | 8/2008 | Riman | A61L 27/32 428/330 |
| 2008/0206562 A1* | 8/2008 | Stucky | B01J 13/02 428/403 |
| 2011/0124492 A1 | 5/2011 | Loukine et al. | |
| 2011/0129204 A1* | 6/2011 | Lee | B01J 35/004 392/438 |
| 2012/0245024 A1* | 9/2012 | Chaput | B01J 21/16 502/339 |
| 2014/0004348 A1* | 1/2014 | Vucak | B01J 2/006 428/403 |
| 2014/0178262 A1* | 6/2014 | Tran | B01J 32/00 422/171 |
| 2014/0187413 A1* | 7/2014 | Lagaron Cabello | C01B 33/38 502/62 |
| 2015/0166682 A1* | 6/2015 | Powell | C07G 1/00 127/37 |
| 2015/0314275 A1* | 11/2015 | Cho | B82B 1/00 502/185 |
| 2016/0052851 A1* | 2/2016 | Ramesh | B01J 27/198 568/471 |
| 2016/0304436 A1* | 10/2016 | Schaack | C07C 209/72 |
| 2018/0161762 A1* | 6/2018 | Ouf | B01J 23/75 |
| 2018/0305294 A1* | 10/2018 | Kadi | B01J 27/1856 |

OTHER PUBLICATIONS

Xiaoshuang Qian, et al., "Metal Phosphate-Supported Pt Catalysts for CO Oxidation", Materials, vol. 7, 2014, pp. 8105-8130.

Cheng-Lan Lin, et al., "Platinum nanoparticles supported on zirconia-carbon black nanocomposites for methanol oxidation reaction", Research on Chemical Intermediates, vol. 40, Issue 6, Jul. 2014, pp. 2207-2215.

* cited by examiner

NANOCOMPOSITE HOLLOW SPHERE AS A PHOTOCATALYST AND METHODS THEREOF

BACKGROUND OF THE DISCLOSURE

Technical Field

The present disclosure relates to a nanocomposite hollow sphere of zirconium dioxide, hydroxyapatite and platinum, a method for producing the nanocomposite hollow sphere, and a method for reducing an aromatic nitro compound to an aromatic amine compound employing the nanocomposite hollow sphere.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Hydroxyapatite $Ca_{10}(PO_4)_6(OH)_2$, (HAP) is generally considered a building block of bones and teeth. It is a naturally occurring mineral that can also be synthesized in the lab [Ceramics International 39 (2013) S379-S382—incorporated herein by reference in its entirety]. Along with its biological applications, HAP can be used as a catalyst in chemical reactions. Scientists have developed various methods for the preparation of HAP in various forms and structures and used it in photocatalysis and other applications [Materials Letters 137(2014)256-259; and Materials Letters 178(2016)15-17—each incorporated herein by reference in its entirety]. To enhance the catalytic activity of hydroxyapatite many scientists synthesized hydroxyapatite with incorporation of metals and other groups in its structure. For example, Mohamed and Baeissa prepared $Pd-TiO_2$-hydroxyapatite nanoparticles and applied this material in the photodegradation of cyanide [Applied Catalysis A: General 464-465 (2013) 218-224—incorporated herein by reference in its entirety]. Other researchers have also incorporated $TiO_2$ or $TiO_2$ and a metal into the structure of hydroxyapatite for the use of the synthesized product in photocatalysis, disinfection, and air purification [Materials Research Bulletin 44 (2009) 768-774; and Applied SurfaceScience 256 (2010) 6390-6394; and Water Air Soil Pollut (2016) 227:461; and Materials Chemistry and Physics 129 (2011) 654-659; and Water Research 41 (2007) 379-386; and Reac Kinet Mech Cat (2012) 107:89-103—each incorporated herein by reference in its entirety]. Zinc (Zn), calcium (Ca), zirconium (Zr), silver phosphate ($Ag_3PO_4$), and other groups have been incorporated into hydroxyapatite [Appl Nanosci (2015) 5:719-729; and Journal of the European Ceramic Society 36 (2016) 2903-2912; and Journal of Photochemistry and Photobiology A: Chemistry 311 (2015) 30-34; and Journal of Hazardous Materials 299 (2015) 379-387; and Chemical Engineering Journal 165 (2010) 117-121—each incorporated herein by reference in its entirety]. Various preparation methods can be exploited to prepare these materials. For example, Silva and Domingues prepared hydroxyapatite-zirconia composites by the precipitation method [Materials Research Bulletin 45 (2010) 2036-2039—incorporated herein by reference in its entirety]. Anmin, et al. reported the preparation of nanocrystals of a hydroxyapatite/$TiO_2$ compound by hydrothermal treatment [Applied Catalysis B: Environmental 63 (2006) 41-44—incorporated herein by reference in its entirety]. Nathanael, et al. reported a combined high gravity and hydrothermal process for the preparation of hydroxyapatite/titania nanocomposites [Composites Science and Technology 70 (2010) 419-426—incorporated herein by reference in its entirety].

$ZrO_2$ is an important catalyst that has attracted many researchers for its favorable chemical and physical properties. Researchers have synthesized many materials based on $ZrO_2$ in many forms and structures and employing various preparation methods. Kadi and Mohamed reported enhanced photocatalytic activity of $ZrO_2-SiO_2$ nanoparticles by platinum doping [International Journal of Photoenergy, Volume 2013, Article ID 812097—incorporated herein by reference in its entirety]. Alfaki and Davar synthesized zirconia nanosheets by a modified Pechini method in order to study its luminescence and photocatalyst properties [Journal of Molecular Liquids 221 (2016) 1071-1079—incorporated herein by reference in its entirety]. Additionally, researchers have doped zirconia with metals such as neodymium (Nd), gold (Au) and other groups [Optik 127 (2016) 10288-10296; and Materials ScienceinSemiconductorProcessing 32 (2015) 131-136; and Applied Surface Science 324 (2015) 652-661; and Journal of Energy Chemistry (2016) 1-7—each incorporated herein by reference in its entirety].

The combination of $ZrO_2$ and HAP has been reported by some researchers. The precipitation method reported by Silva and Domingues yielded homogeneous powders with a well-defined particle size distribution range (0.20-0.35 µm) and an agglomerated medium size ranging from 1.60-2.00 µm. Astokova, et al. reported the preparation of zirconia/hydroxyapatite composites via a precipitation synthesis. The method yielded nanoparticle composites having a microporous structure and with a grain size of up to 10 µm. Drdlik, et al. utilized electrophoretic deposition to synthesize hydroxyapatite/zirconia microfiber composites with controlled microporosity and a superior fracture toughness compared to hydroxyapatite [Ceramics International 41(2015), 11202-11212—incorporated herein by reference in its entirety].

In view of the forgoing, one objective of the present disclosure is to provide a zirconium dioxide/platinum/hydroxyapatite nanocomposite hollow sphere and/or particle possessing photocatalytic activity, a method for producing thereof, and a method for photoctalytically reducing an aromatic nitro compound to an aromatic amine compound employing the nancomposite hollow sphere and/or particle.

BRIEF SUMMARY OF THE DISCLOSURE

According to a first aspect, the present disclosure relates to a nanocomposite hollow sphere comprising a shell surrounding a hollow core, the shell comprising i) zirconium dioxide, ii) 20-30% by weight hydroxyapatite relative to the total weight of the shell, and iii) 1-5% by weight platinum relative to the total weight of the shell, wherein an average diameter of the hollow core is in the range of 10-30 nm.

In one embodiment, the nanocomposite hollow sphere has a band gap energy of less than 2.9 eV.

In one embodiment, the nanocomposite hollow sphere has a shell which is mesoporous with an average pore size in a range of 2-10 nm.

In one embodiment, the nanocomposite hollow sphere has a BET surface area in a range of 300-400 $m^2$/g.

In one embodiment, the nanocomposite hollow sphere has an average shell thickness in a range of 0.1-5.0 nm.

In one embodiment, the shell comprises 24-26% by weight hydroxyapatite relative to the total weight of the shell and 2-4% by weight platinum relative to the total weight of the shell.

According to a second aspect, the present disclosure relates to a method for producing the nanocomposite hollow sphere of the present disclosure in any of its embodiments, the method comprising i) dissolving an organic zirconium salt and a hexachloroplatinate salt in a first solvent comprising an alcohol, a mineral acid, and an ammonium hydroxide base, thereby forming a first mixture, ii) adding a solution to the first mixture, the solution comprising hydroxyapatite and a second solvent, thereby forming a second mixture, and iii) heating the second mixture in an autoclave thereby forming the nanocomposite hollow sphere of the present disclosure in any of its embodiments.

In one embodiment, the mineral acid is nitric acid, the ammonium hydroxide base is tetrapropylammonium hydroxide, the hexachloroplatinate salt is chloroplatinic acid, and the organic zirconium salt is zirconium propoxide.

In one embodiment, the molar ratio of the organic zirconium salt to hydroxyapatite in the second mixture is in a range of 1.1:1 to 3:1 and the molar ratio of hydroxyapatite to the hexachloroplatinate salt in the second mixture is in a range of 25:1 to 1:1.

In one embodiment, the ammonium hydroxide base is present in a molar excess relative to the mineral acid.

In one embodiment, the first solvent is a mixture comprising water and propanol with a volume ratio of water to propanol in a range of 5:1 to 1:1 and the second solvent is n-hexane.

According to a third aspect, the present disclosure relates to a method for reducing an aromatic nitro compound to an aromatic amine compound, the method comprising i) contacting the aromatic nitro compound with the nanocomposite hollow sphere of the present disclosure in any of its embodiments in a solvent to form a reaction mixture, and ii) irradiating the reaction mixture with a light source having a wavelength of 300-800 nm thereby forming the aromatic amine compound.

In one embodiment, the aromatic nitro compound is m-nitroaniline and the aromatic amine compound is m-phenylenediamine.

In one embodiment, the method has a photocatalytic conversion of the aromatic nitro compound to the aromatic amine compound of greater than 80%.

In one embodiment, the irradiating is performed in the presence of a hole scavenger and an absence of oxygen.

In one embodiment, the hole scavenger is triethanolamine.

In one embodiment, 0.1-5.0 grams of the nanocomposite hollow sphere is present per liter of the reaction mixture.

In one embodiment, the irradiating is performed at a temperature of 10-70° C. and a pressure of 0.5-2.0 atm for a time period of 1 to 120 minutes.

In one embodiment, the method further comprises i) recovering the nanocomposite hollow sphere after the aromatic amine compound is formed, and ii) recycling the recovered nanocomposite hollow sphere in at least two reaction cycles.

In one embodiment, a photocatalytic conversion of the aromatic nitro compound to the aromatic amine compound is reduced by less than 10 percentage points after at least 2 reaction cycles.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
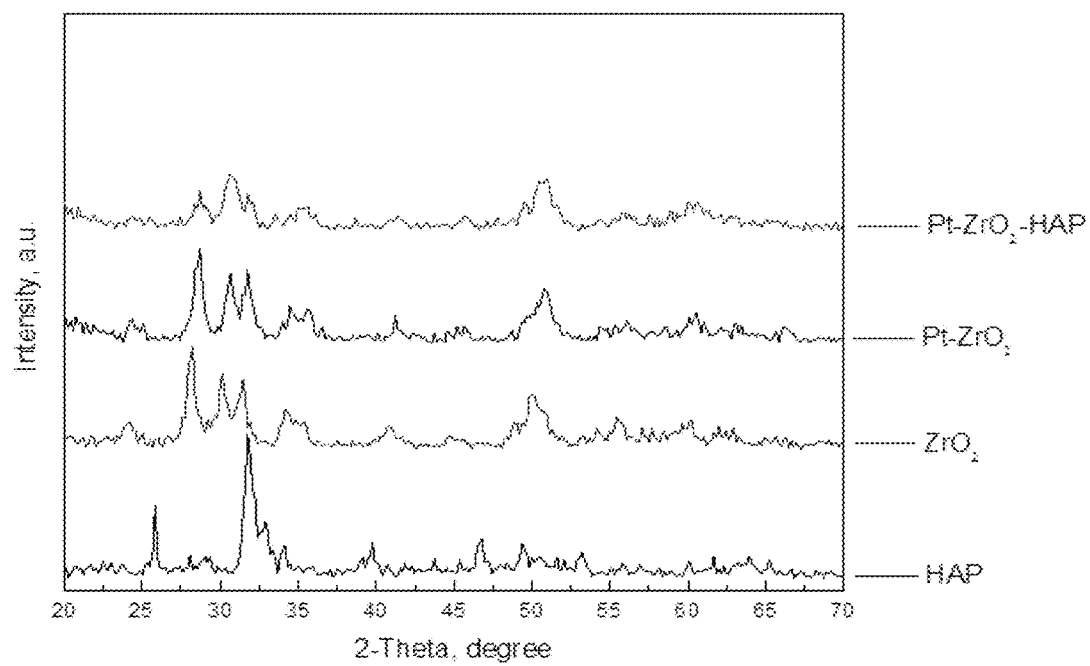
FIG. 1 shows the X-ray diffraction (XRD) patterns of hydroxyapatite (HAP), zirconia ($ZrO_2$), platinum-modified zirconia (Pt—$ZrO_2$) and platinum/hydroxyapatite modified zirconia (Pt—$ZrO_2$—HAP).

Embodiments of the present disclosure will now be described more fully hereinafter with reference to the accompanying drawings, in which some, but not all of the embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a nanocomposite hollow sphere comprising a shell surrounding a hollow core, the shell comprising i) zirconium dioxide, ii) 20-30% by weight hydroxyapatite relative to the total weight of the shell, and iii) 1-5% by weight platinum relative to the total weight of the shell, wherein an average diameter of the hollow core is in the range of 10-30 nm.

As used herein, zirconium dioxide ($ZrO_2$, zirconia) is a white crystalline oxide of zirconium. Its most common naturally occurring form, with a monoclinic crystalline structure, is the mineral baddeleyite. Three phases of zirconium dioxide are known: monoclinic <1170° C., tetragonal 1170-2370° C., and cubic >2370° C. In terms of the present disclosure, the zirconium dioxide may be monoclinic, tetragonal, and/or cubic, preferably monoclinic. The general trend is for high symmetry at higher temperatures. In certain embodiments, a small percentage of the oxides of calcium and/or yttrium may stabilize the cubic phase, such as, for example the rare mineral tazheranite (Zr, Ti, Ca)$O_2$, which is cubic. Unlike $TiO_2$, which features six-coordinate Ti in all phases, monoclinic zirconia consists of seven-coordinate zirconium centers. This difference may be attributed to the larger size of the zirconium atom relative to the titanium ion.

$ZrO_2$ adopts a monoclinic crystal structure at room temperature and transitions to tetragonal and cubic at higher temperatures. In certain embodiments the zirconia may be blended with other oxides which may stabilize tetragonal and/or cubic phases. Effective exemplary dopants include, but are not limited to, magnesium oxide (MgO), yttrium oxide ($Y_2O_3$, yttria), calcium oxide (CaO), and cerium (III) oxide ($Ce_2O_3$). It is equally envisaged that additional oxides or hydroxides may be employed in addition to or in lieu of zirconium dioxide. Exemplary suitable materials include, but are not limited to, $TiO_2$, $SiO_2$, $SnO_2$, $ZrO_2$, $Al_2O_3$, $V_2O_5$, ZnO, $WO_3$, $MoO_3$, $Al(OH)_3$, $Mg(OH)_2$, and combinations thereof.

As used herein, hydroxyapatite (HA, HAP, hydroxylapatite) refers to a naturally occurring mineral form of calcium apatite with the formula $Ca_5(PO_4)_3(OH)$, but is usually written $Ca_{10}(PO_4)_6(OH)_2$ to denote that the crystal unit comprises two entities. Hydroxylapatite is the hydroxyl endmember of the complex apatite group. In certain embodiments, the OH$^-$ ion can be replaced by fluoride, chloride, and/or carbonate, producing fluorapatite or chlorapatite. It crystallizes in the hexagonal crystal system. Pure hydroxyapatite powder is white. Naturally occurring apatite may, however, also have brown, yellow, or green colorations. In certain embodiment, the hydroxyapatite of the present disclosure may be calcium deficient (i.e. non-stoichiometric). As used herein, calcium deficient (non-stoichiometric) hydroxyapatite, $Ca_{10}(PO_4)_{6-x}(HPO_4)_x(OH)_{2-x}$ (where x is between 0 and 1) has a Ca:P ratio between 1.5 and 1.67. The Ca:P ratio is often used in the discussion of calcium phosphate phases. Stoichiometric apatite $Ca_{10}(PO_4)_6(OH)_2$ has a Ca:P ratio of 10:6 normally expressed as 1.67. The non-stoichiometric phases have the hydroxyapatite structure with cation vacancies ($Ca^{2+}$) and anion (OFF) vacancies. The sites occupied solely by phosphate anions in stoichiometric hydroxyapatite are occupied by phosphate or hydrogen phosphate $HPO_4^{2-}$ anions. Preparation of these calcium deficient phases can be prepared by precipitation from a mixture of calcium nitrate and diammonium phosphate with the desired Ca:P ratio, for example to prepare a sample with a Ca:P ratio of 1.6. Sintering these non-stoichiometric phases may form a solid phase which is an intimate mixture of tricalcium phosphate and hydroxyapatite, often termed biphasic calcium phosphate.

In a preferred embodiment, the nanocomposite hollow spheres and/or particles of the present disclosure comprise a shell surrounding a hollow core, the shell comprising 20-30% by weight hydroxyapatite relative to the total weight of the shell, preferably 21-29% by weight, preferably 22-28% by weight, preferably 23-27% by weight, more preferably 24-26% by weight, more preferably 24.5-25.5% by weight, or about 25% by weight hydroxyapatite relative to the total weight of the shell.

It is equally envisaged that one or more metal phosphates may be used in addition to and/or in lieu of hydroxyapatite. Exemplary suitable metal phosphates include, but are not limited to, those of the general formula M-P—O, wherein M is preferably at least one metal selected from the group consisting of Mg, Al, Ca, Fe, Co, Zn, and La.

In a preferred embodiment, the nanocomposite hollow spheres and/or particles of the present disclosure comprise a shell surrounding a hollow core, the shell comprising 1-5% by weight platinum relative to the total weight of the shell, preferably 1.5-4.5% by weight, preferably 1.75-4.25% by weight, more preferably 2-4% by weight, more preferably 2.25-3.75% by weight, more preferably 2.5-3.5% by weight, or about 3% by weight platinum relative to the total weight of the shell.

It is equally envisaged that one or more metal ions may be used in addition to and/or in lieu of platinum. Exemplary suitable metal ions include, but are not limited to, vanadium (II), vanadium (III), chromium (II), chromium (III), manganese (II), cobalt (II), cobalt (III), nickel (II), copper (II), zinc (II), molybdenum (II), molybdenum (III), molybdenum (IV), molybdenum (V), molybdenum (VI), gold (I), gold (III), platinum (II), platinum (IV), niobium (III), niobium (IV), niobium (V), tungsten (I), tungsten (II), tungsten (III), tungsten (IV), tungsten (V), tungsten (VI), ruthenium (II), ruthenium (III), and/or ruthenium (IV).

In one embodiment, the platinum, the hydroxyapatite, or both are incorporated into the lattice structure of the zirconium dioxide. Such as, for example, the platinum and/or hydroxyapatite may be embedded between zirconium dioxide molecules to become integral with the lattice or the platinum and/or hydroxyapatite may be embedded into pores of the zirconium dioxide lattice and thus not integral to the zirconium dioxide lattice. In certain other embodiments, the platinum and/or hydroxyapatite is not incorporated into the lattice structure of the zirconium dioxide and may be adsorbed onto a surface (e.g. by van de Waals and/or electrostatic forces) of the nanocomposite hollow sphere and/or particle.

In a preferred embodiment, the nanocomposite hollow sphere comprises a shell surrounding a hollow core, the shell comprising i) zirconium dioxide, ii) 25% by weight hydroxyapatite relative to the total weight of the shell, and iii) 3% by weight platinum relative to the total weight of the shell.

In certain embodiments, the nanocomposite hollow sphere comprises a shell surrounding a hollow core, the shell comprising zirconium dioxide, hydroxyapatite, and platinum. In a preferred embodiment, the shell surrounds no less than 50% of the hollow core, preferably no less than 60%, preferably no less than 70%, preferably no less than 80%, preferably no less than 90%, preferably no less than 95%, preferably no less than 98%, preferably no less than 99%, preferably no less than 99.5%, preferably no less than 99.9% or about 100% of the hollow core. The shape of the core may generally determine the shape of the nanocomposite hollow particle. In a preferred embodiment, the nanocomposite hollow particle is spherical or substantially spherical (e.g. oval or oblong in shape). In certain embodiments, the nanocomposite hollow particle may be of any shape that provides the desired properties and/or photocatalytic activity. In certain embodiments, the nanocomposite hollow particle may be in the form of at least one shape selected from the group including, but not limited to, a sphere, a rod, a cylinder, a 3-dimensional form having one or more sides in the form of a rectangle, a triangle, a pentagon, and/or a hexagon, a prism, a disk, a platelet, a cube, a cuboid, and an urchin (e.g. a globular particle possessing a spiky uneven surface).

In a preferred embodiment, the nanocomposite hollow spheres and/or particles of the present disclosure may be uniform. As used herein, the term "uniform" refers to no more than 10%, preferably no more than 5%, preferably no more than 4%, preferably no more than 3%, preferably no more than 2%, preferably no more than 1% of the distribution of the nanocomposite hollow spheres and/or particles having a different shape. For example, the nanocomposite hollow spheres and/or particles are uniform and have no more than 1% of nanocomposite hollow particles in an oblong shape. In certain embodiments, the nanocomposite hollow particles may be non-uniform. As used herein, the term "non-uniform" refers to more than 10% of the distribution of the nanocomposite hollow particles having a different shape.

As used herein, "dispersity" is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and may be defined as the ratio of the standard deviation ($\sigma$) to the mean ($\mu$, or its absolute value $|\mu|$). The coefficient of variation or relative standard deviation is widely used to express precision and/or repeatability. It may show the extent of variability in relation to the mean of a population. In a preferred embodiment, the nanocomposite hollow spheres and/or particles of the present disclosure have a narrow size dispersion, i.e. monodispersity. As used herein, "monodisperse", "monodispersed" and/or "monodispersity" refers to nanocomposite hollow spheres and/or particles which have a CV or RSD of less than 30%, preferably less than 25%, preferably less than 20%, preferably less than 15%, preferably less than 12%, preferably less than 10%, preferably less than 8%, preferably less than 5%.

In a preferred embodiment, the nanocomposite hollow spheres and/or particles of the present disclosure are monodisperse with a coefficient of variation or relative standard deviation (ratio of the particle size standard deviation to the particle size mean) of less than 15%, preferably less than 12%, preferably less than 10%, preferably less than 9%, preferably less than 8%, preferably less than 7%, preferably less than 6%, preferably less than 5%, preferably less than 4%, preferably less than 2%. In a preferred embodiment, the nanocomposite hollow spheres, and/or particles are monodisperse and have a particle diameter distribution in a range of 75% of the average particle diameter to 125% of the average particle diameter, preferably 80-120%, preferably 85-115%, preferably 86-114%, preferably 87-113%, preferably 88-112%, preferably 89-111%, preferably 90-110%, preferably 95% of the average particle diameter to 105% of the average particle diameter.

As used herein, a diameter of the sphere and/or particle refers to the longest linear distance measured from one point on the particle though the center of the particle to a point directly across from it. In a preferred embodiment, the average diameter of the nanocomposite hollow sphere and/or particle of the present disclosure may be in the range of 5-40 nm, preferably 8-35 nm, preferably 10-30 nm, preferably 12-28 nm, preferably 14-26 nm, preferably 15-25 nm, preferably 16-24 nm, preferably 18-22 nm. In certain embodiments, the average diameter of the nanocomposite hollow sphere and/or particles is in a range of 50-99% of the average diameter of a substantially similar nanocomposite hollow sphere and/or particle lacking the hydroxyapatite, the platinum, or both, preferably 55-95%, preferably 60-93%, preferably 65-90%, preferably 70-90%, preferably 80-90%, preferably 85-90% of the average diameter of a substantially similar nanocomposite hollow sphere and/or particle lacking the hydroxyapatite, the platinum, or both. In a preferred embodiment, the average diameter of the hollow core is in a range of 10-30 nm, preferably 12-28 nm, preferably 14-26 nm, preferably 15-25 nm, preferably 16-24 nm, preferably 18-22 nm. In certain embodiments, the nanocomposite hollow sphere and/or particle may be agglomerated, or preferably non-agglomerated meaning the nanocomposite hollow spheres and/or particles are well separated from one another and do not form clusters.

In a preferred embodiment, the average shell thickness is in a range of 0.1-5.0 nm, preferably 0.2-4.0 nm, preferably 0.3-3.0 nm, preferably 0.4-2.0 nm, preferably 0.5-1.0 nm. In a preferred embodiment, the shell is of uniform thickness. Alternatively, the shell may be of non-uniform thickness. The term "uniform thickness" refers to an average shell thickness that differs by no more than 5%, no more than 4%, no more than 3%, no more than 2%, preferably no more than 1% at any given location on the shell. The term "non-uniform thickness" may refer to an average shell thickness that differs by more than 5% at any given location on the shell.

In a preferred embodiment, the nanocomposite hollow sphere and/or particle of the present disclosure may be microporous or mesoporous. As used herein, the term "microporous" means a structure having an average pore diameter of less than 2 nm and the term "mesoporous means a structure having and average pored diameter of 2-50 nm. In a preferred embodiment, the nanocomposite hollow sphere and/or particle of the present disclosure is mesoporous with an average pore size in the range of 2-10 nm, preferably 2-8 nm, preferably 3-6 nm, preferably 3.5-5.5 nm, preferably 4-5 nm. As used herein, porosity is defined as the percentage of void space in a solid. As used herein, porous materials are those where the void space is deliberately introduced to fulfill certain functions. Total porosity (volume fraction of pores) is defined as $\phi=1-\rho_r$, where $\rho_r=\mu/\rho_0$ and is the relative density of the solid phase matrix or skeleton ($\rho$=bulk density and $\rho_0$=theoretical density). It is expressed as a percentage of the theoretical density (TD) of the solid as a whole. In a preferred embodiment, the nanocomposite hollow spheres and/or particles the present disclosure have a percent porosity of at least 30%, preferably at least 35%, preferably at least 40%, preferably at least 45%, preferably at least 50%, preferably at least 55%, preferably at least 60%, preferably at least 65%, preferably at least 70%. In certain embodiments, a porosity of the nanocomposite hollow sphere and/or particles of the present disclosure may be in a range of 0.5-95 vol % based on a total volume of the nanocomposite hollow sphere and/or particle, preferably 1.0-80 vol %, preferably 2.0-70 vol %, preferably 3.0-60 vol %, preferably 4.0-50 vol %, preferably 5.0-40 vol %, preferably 6.0-35 vol %, preferably 8.0-30 vol %, preferably 10-20 vol %.

The Brunauer-Emmet-Teller (BET) theory aims to explain the physical adsorption of gas molecules on a solid surface and serves as the basis for an important analysis technique for the measurement of the specific surface area of a material. Specific surface area is a property of solids which is the total surface area of a material per unit of mass, solid or bulk volume, or cross sectional area. In a preferred embodiment the nanocomposite hollow spheres and/or particles of the present disclosure in any of their embodiments have a BET surface area in the range of 300-400 $m^2/g$, preferably 310-390 $m^2/g$, preferably 320-380 $m^2/g$, preferably 325-375 $m^2/g$, preferably 330-360 $m^2/g$, preferably 335-358 $m^2/g$, preferably 340-356 $m^2/g$, preferably 345-354 $m^2/g$ or about 350 $m^2/g$ As used herein, surface roughness refers to a component of surface texture. It may be quantified by the deviations in the direction of the normal vector of a real surface from its ideal form. If these deviations are large, the surface is rough; if they are small, the surface is smooth. In surface metrology, roughness is typically considered to be the high-frequency, short-wavelength component of the measured surface. In a preferred embodiment, the nanocomposite hollow spheres and/or particles of the present disclosure have a surface roughness in a range from 0.001-5.0 nm, preferably 0.01-2.0 nm, preferably 0.02-1.0 nm, preferably 0.02-0.5 nm, preferably 0.05-0.4 nm, preferably 0.05-0.3 nm, preferably 0.05-0.2 nm, preferably 0.05-0.1 nm.

As used herein, band gap energy, band gap, and/or energy gap refers to an energy range in a solid where no electron states can exist. In graphs of the electronic band structure of solids, the band gap generally refers to the energy difference (in electron volts) between the top of the valence band and the bottom of the conduction band in insulators and/or semiconductors. It is generally the energy required to promote a valence electron bound to an atom to become a conduction electron, which is free to move within the crystal lattice and serve as a charge carrier to conduct electric current. It is closely related to the HOMO/LUMO gap in chemistry. In a preferred embodiment, the nanocomposite hollow spheres and/or particles of the present disclosure have a band gap energy or band gap value of less than 2.9 eV, preferably less than 2.88 eV, preferably less than 2.86 eV, preferably less than 2.84 eV, preferably less than 2.82 eV, preferably less than 2.8 eV, preferably less than 2.79 eV, preferably less than 2.78 eV, such as, for example 2.0-2.9 eV, preferably 2.1-2.88 eV, preferably 2.2-2.86 eV, preferably 2.4-2.84 eV, preferably 2.6-2.82 eV, preferably 2.7-2.8 eV, preferably 2.75-2.79 eV, or about 2.78 eV.

In certain embodiments, the dimensions, contents and properties of the nanocomposite hollow spheres and/or particles, their shell and/or core may vary from these ranges and the nanocomposite hollow spheres and/or particles may still function as intended and/or possess the intended photocatalytic properties.

According to a second aspect, the present disclosure relates to a method for producing the nanocomposite hollow sphere of the present disclosure in any of its embodiments, the method comprising i) dissolving an organic zirconium salt and a hexachloroplatinate salt in a first solvent comprising an alcohol, a mineral acid, and an ammonium hydroxide base, thereby forming a first mixture, ii) adding a solution to the first mixture, the solution comprising hydroxyapatite and a second solvent, thereby forming a second mixture, and iii) heating the second mixture in an autoclave thereby forming the nanocomposite hollow sphere of the present disclosure in any of its embodiments.

As used herein, the term "solvent" refers to and includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide) and polar protic solvents (e.g. acetic acid, n-butanol, isopropanol, n-propanol, ethanol, methanol, formic acid, water) and mixtures thereof.

In a preferred embodiment, the second solvent is a non-polar solvent, preferably n-hexane. In a preferred embodiment, the first solvent is a mixture comprising water and an alcohol, preferably propanol, which has a volume ratio of water to propanol in the range of 5:1 to 1:1, preferably 4:1 to 1.5:1, preferably 3:1 to 2:1, or about 2.5:1.

As used herein, a salt refers to an ionic compound resulting from the neutralization reaction of an acid and a base. Salts are composed of related numbers of cations (positively charged ions) and anions (negative ions) such that the product is electrically neutral (without a net charge). These component ions can be inorganic (i.e. chloride, $Cl^-$) or organic (i.e. acetate, $CH_3CO_2^-$) and can be monoatomic (i.e. fluoride, $F^-$) or polyatomic (i.e. sulfate, $SO_4^{2-}$). Exemplary conventional salts include, but are not limited to, those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic, and mixtures thereof and the like.

In a preferred embodiment, the zirconium salt is a zirconium (IV) salt, preferably an organic zirconium (IV) salt. Exemplary zirconium (IV) salts include, but are not limited to, ammonium zirconium (IV) carbonate, zirconium (IV) bromide, zirconium (IV) carbonate hydroxide oxide, zirconium (IV) chloride, zirconium (IV) fluoride, zirconium (IV) hydrogenphosphate, zirconium (IV), zirconium (IV) chloride tetrahydrofuran, zirconium (IV) hydroxide, zirconium (IV) iodide, zirconium (IV) oxynitrate hydrate, zirconium (IV) sulfate hydrate, and the like. In a preferred embodiment, the organic zirconium salt is zirconium propoxide.

As used herein, hexachloroplatinate is an anion with the chemical formula $[PtCl_6]^{2-}$. Exemplary hexachloroplatinate salts include, but are not limited to, chloroplatinic acid (or dihydrogen hexachloroplatinate, $H_2PtCl_6$, $[H_3O]_2[PtCl_6]$ $(H_2O)_x$, the hydronium salt of the hexachloroplatinate anion), ammonium hexachloroplatinate, potassium hexachloroplatinate, and sodium hexachloroplatinate. In a preferred embodiment, the hexachloroplatinate salt is chloroplatinic acid. In certain embodiments, it is equally envisaged that a hexafluoroplatinate salt may be employed in lieu of or in addition to the hexachloroplatinate salt.

In a preferred embodiment, the molar ratio of the organic zirconium salt to hydroxyapatite in the second mixture is in the range of 1.1:1 to 3:1, preferably 1.5:1 to 2.5:1, preferably 1.75:1 to 2.25:1, or about 2.0:1. In a preferred embodiment, the molar ratio of the hydroxyapatite to the hexachloroplatinate in the second mixture is in a range of 25:1 to 1:1, preferably 22:1 to 5:1, preferably 20:1 to 10:1, preferably 18:1 to 15:1, or about 17:1.

As used herein, the term "base" refers to and includes, but is not limited to, an alkali metal hydride (e.g. sodium hydride, potassium hydride), an alkali metal hydroxide (e.g. lithium hydroxide, potassium hydroxide, sodium hydroxide, cesium hydroxide), an alkali metal carbonate (e.g. lithium carbonate, potassium carbonate, sodium carbonate, cesium carbonate), an alkali metal acetate (e.g. lithium acetate, sodium acetate, potassium acetate), an amine (e.g. a trialkylamine of formula $NR'_3$, wherein each R' may be independently ethyl, n-propyl, and n-butyl, a dialkylamine of formula $HNR'_2$, diethylamine, di-n-butylamine, pyrrolidine, piperidine, triethylamine, tri-n-butylamine, diisopropylethylamine, dicyclohexylmethylamine, pyridine, 2,6-dimethylpyridine, 4-aminopyridine, N-methyl-2,2,6,6-tetramethylpiperidine, 2,2,6,6-tetramethylpiperidine, 2,6-di-tert-butylpyridine, 1,4-diazabicyclo[2.2.2]octane, and mixtures thereof), and mixtures thereof. In a preferred embodiment, the base is an ammonium hydroxide base, preferably tetrapropylammonium hydroxide or tetramethylammonium hydroxide most preferably the ammonium hydroxide base is tetrapropylammonium hydroxide.

As used herein, the term "acid" refers to mineral acids, sulfonic acids, carboxylic acids, halogenated carboxylic acids, vinyl carboxylic acids, and polycarboxylic acids, as well as strong acids and weak acids (e.g., hydrochloric acid, nitric acid, phosphoric acid, sulfuric acid, citric acid, glycolic acid, and lactic acid). In a preferred embodiment, the mineral acid is nitric acid, preferably 1.0 M nitric acid. In a preferred embodiment, the ammonium hydroxide base is present in a molar excess relative to the mineral acid.

In a preferred embodiment, the second mixture is stirred at a temperature of 10-70° C., preferably 10-60° C., preferably 10-50° C., preferably 15-40° C., preferably 18-35° C., preferably 20-30° C. for a time period of 1-360 minutes, preferably 5-300 minutes, preferably 10-240 minutes, preferably 15-180 minutes, preferably 20-150 minutes, preferably 30-140 minutes, or about 120 minutes. In certain embodiments, the second mixture is then left to stand until the formation of a gel. In one step, the second mixture is heated in an autoclave thereby forming the nanocomposite hollow sphere of the present disclosure. In a preferred embodiment, the gel is dried using a supercritical drying method using an autoclave. As used herein, supercritical drying refers to a process to remove liquid in a precise and controlled way. In a supercritical drying method a substance is transformed into a gas in the absence of surface tension and capillary stress. These processes are commonly used when gels must be transformed into aerogels. Typically in these processes, when the liquid is dried by a supercritical method, the liquid evaporates leaving a pore without damaging the material's nanostructure network.

According to a third aspect, the present disclosure relates to a method for reducing an aromatic nitro compound to an aromatic amine compound, the method comprising i) contacting the aromatic nitro compound with the nanocomposite hollow sphere of the present disclosure in any of its embodiments in a solvent to form a reaction mixture, and ii) irradiating the reaction mixture with a light source having a wavelength of 300-800 nm thereby forming the aromatic amine compound.

In certain embodiments, the method may be conducted as a batch or continuous process. The reaction mixture may be shaken/stirred throughout the duration of the irradiating or reaction by employing a rotary shaker, a magnetic stirrer, or an overheard stirrer. In certain embodiments, the reaction mixture may be left to stand (i.e. not stirred). In certain embodiments, the reaction mixture may be sonicated.

In certain embodiments, the irradiating may be performed by a light source internal or external to a reactor and may provide the photon energy necessary to activate the nanocomposite hollow sphere as a photocatalyst. The light source may be from any known light source including, but not limited to, natural solar sunlight, UV light, laser light, incandescent light, and the like. Exemplary light sources include, but are not limited to, a xenon lamp, a mercurial lamp, a metal halide lamp, an LED lamp, a solar simulator, and a halogen lamp. In certain embodiments, two or more light sources may be used. In a preferred embodiment, the reaction mixture is irradiated with visible light having a wavelength of 300-800 nm, preferably 385-740 nm, preferably 400-700 nm.

In certain embodiments, the nanocomposite hollow spheres and/or particles are dispersed within the reaction mixture, and may further be filtered and recycled after the reduction of the aromatic nitro compound to an aromatic amine compound. In one embodiment, the nanocomposite hollow spheres and/or particles are placed in a bag (preferably transparent) and the bag is immersed in the reaction mixture. Accordingly, the nanocomposite hollow spheres and/or particles remain in the bag until the reduction reaction is completed. A material that permits at least 50%, preferably at least 75%, preferably at least 80%, preferably at least 90%, preferably at least 95% of light of any portion of the light spectrum to pass through the bag may be considered transparent.

The general nature of the aromatic nitro compound substrate is not viewed as particularly limiting to the reduction process described herein in any of its embodiments. In a preferred embodiment, the aromatic nitro compound is m-nitroaniline and the corresponding aromatic amine compound is m-phenylenediamine. It is equally envisaged that the method of the present disclosure may be adapted to additional optionally substituted alkyl, cycloalkyl, aryl, or heterocyclic substrates comprising a nitro group or similar moieties of larger and/or more complex compounds comprising a nitro group. It is equally envisaged that the method of the present disclosure may be adapted to additional reducible functional groups in addition to or in lieu of a nitro group.

In a preferred embodiment, the method has a photocatalytic conversion of the aromatic nitro compound to the aromatic amine compound of greater than 80%, preferably greater than 82%, preferably greater than 84%, preferably greater than 86%, preferably greater than 88%, preferably greater than 90%, preferably greater than 92%, preferably greater than 94%, preferably greater than 95%, preferably greater than 96%, preferably greater than 97%, preferably greater than 98%, preferably greater than 95%.

In a preferred embodiment, 0.1-5.0 grams of the nanocomposite hollow sphere is present per liter of the reaction mixture, preferably 0.15-4.0 grams, preferably 0.2-3.5 grams, preferably 0.25-3.0 grams, preferably 0.3-2.5 grams, preferably 0.4-2.0 grams, preferably 0.45-1.5 grams, preferably 0.5-1.0 grams of the nanocomposite hollow sphere is present per liter of the reaction mixture.

In a preferred embodiment, the solvent of the reaction mixture is aqueous comprising water which may be tap water, distilled water, doubly distilled water, deionized water, deionized distilled water, or combinations thereof. In certain embodiments, the solvent of the reaction mixture may comprise up to 30 vol % of an alcohol, preferably up to 25 vol %, preferably up to 20 vol %, preferably up to 15 vol %, preferably up to 10 vol %, preferably up to 5 vol %, preferably up to 2 vol % of an alcohol, such as methanol, ethanol, and/or 2-propanol. Without wishing to be bound by theory, the alcohol may act as a hole scavenger during the irradiating.

In a preferred embodiment the irradiating is performed in an absence of oxygen. Oxygen may be eliminated from the reaction mixture by bubbling of an inert gas such as nitrogen or argon, preferably nitrogen through the reaction mixture at a flow rate of 10-100 mL/min, preferably 20-80 mL/min, preferably 50-70 mL/min, or about 60 mL/min. In a preferred embodiment, the irradiating is performed in the presence of a hole scavenger. Exemplary suitable hole scavengers include, but are not limited to, methanol, ethanol, 2-propanol, acetic acid, salicylic acid, ethylenediaminetetraacetic acid (EDTA), triethanolamine (TEA, TEOA), and the like. In a preferred embodiment, the hole scavenger is tri ethanol amine.

In a preferred embodiment, the irradiating is performed at a temperature of 10-70° C., preferably 10-60° C., preferably 10-50° C., preferably 15-40° C., preferably 18-35° C., preferably 20-30° C. In a preferred embodiment, the irradiating is performed at a pressure of 0.5-2.0 atm, preferably 0.5-1.7 atm, preferably 0.5-1.5 atm, preferably 0.7-1.5 atm, preferably 0.9-1.2 atm. In a preferred embodiment, the irradiating is performed for a time period of 1-120 minutes, preferably 5-100 minutes, preferably 10-90 minutes, preferably 15-75 minutes, preferably 20-60 minutes, preferably 30-50 minutes.

In certain embodiments, the method further comprises i) recovering the nanocomposite hollow sphere after the aromatic amine compound is formed, and ii) recycling the recovered nanocomposite hollow sphere in at least two reaction cycles. In certain embodiment, the nanocomposite hollow sphere may be separated by removing a bag of the nanocomposite hollow sphere, dialysis in a solvent, or using a micro-filter, or a paper filter. As used herein the phrase "recycling the nanocomposite hollow sphere" may refer to a process whereby the nanocomposite hollow sphere or a composition thereof is first washed by an organic and/or aqueous solvent, dried and then added to a new batch of reactants or solution (either for the same or a different type of reduction reaction). Preferred organic solvents for washing the nanocomposite hollow sphere and/or dialysis may include, but are not limited to, methanol, acetone, ethanol, tetrahydrofuran, acetonitrile, dichloromethane, ether, glycol ether, acetamide, dimethyl acetamide, dimethyl sulfoxide, or combinations thereof. The nanocomposite hollow sphere particles or a composition thereof may be dried in vacuum, and/or with heating, for example, the nanocomposite hollow sphere may be dried in a vacuum oven. Dried nanocomposite hollow sphere particles or a composition thereof may be stored in a desiccator until the next run.

In certain embodiments, the nanocomposite hollow sphere is recycled for at least 2 reaction cycles, preferably at least 3 reaction cycles, preferably at least 4 reaction cycles, preferably at least 5 reaction cycles, preferably at least 6 reaction cycles, preferably at least 8 reaction cycles, preferably at least 10 reaction cycles, preferably at least 12 reaction cycles, preferably at least 15 reaction cycles, preferably at least 20 reaction cycles, preferably at least 25 reaction cycles, preferably at least 30 reaction cycles.

In a preferred embodiment, a photocatalytic conversion of the aromatic nitro compound to the aromatic amine compound is reduced by less than 10 percentage points, preferably less than 9 percentage points, preferably less than 8 percentage points, preferably less than 7 percentage points, preferably less than 6 percentage points, preferably less than 5 percentage points, preferably less than 4 percentage points, preferably less than 3 percentage points, preferably less than 2 percentage points, preferably less than 1 percentage point after at least 2 reaction cycles, preferably at least 3 reaction cycles, preferably at least 4 reaction cycles, preferably at least 5 reaction cycles, preferably at least 6 reaction cycles, preferably at least 8 reaction cycles, preferably at least 10 reaction cycles, preferably at least 12 reaction cycles, preferably at least 15 reaction cycles, preferably at least 20 reaction cycles, preferably at least 25 reaction cycles, preferably at least 30 reaction cycles.

In certain embodiments, it is equally envisaged that the nanocomposite hollow spheres of the present disclosure may be employed to decontaminate and/or remediate aqueous water sources. Non-limiting examples of aqueous solutions and/or water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for decontaminating and/or remediating aqueous solutions and/or water sources according to the present disclosure may include contacting the nanocomposite hollow sphere in any of its embodiments with a contaminated water source and/or system. The methods may be carried out in tanks, containers, or small scale applications in both batch mode and fixed-bed or column mode.

In certain embodiments, it is equally envisaged that the nanocomposite hollow spheres of the present disclosure may be employed to photodegrade organic pollutants. Exemplary organic pollutants include, but are not limited to, pesticides such as, for example, aldrin, chlordane, DDT, dieldrin, endrin, heptachlor, hexachlorobenzene, mirex, toxaphene, industrial chemicals such as, for example, hexachlorobenzene, polychlorinated biphenyls (PCBs), methyl tertiary butyl ether, and by-products such as, for example, hexachlorobenzene, polychlorinated dibenzo-p-dioxins, polychlorinated dibenzofurans). It is equally envisaged that the nanocomposite hollow spheres of the present disclosure may be employed in one or more additional photocatalysis reactions including, but not limited to, conversion of water to hydrogen gas by photocatalytic water splitting, oxidation of organic contaminants, and/or conversion of carbon dioxide to gaseous hydrocarbons.

Having generally described this disclosure, a further understanding can be obtained by reference to certain specific examples which are provided herein for purposes of illustration only and are not intended to be limiting unless otherwise specified. The examples below are intended to further illustrate protocols for preparing and characterizing the nanocomposite hollow spheres of the present disclosure. Further, they are intended to illustrate assessing the properties of these materials and assessing their performance in reduction reactions. They are not intended to limit the scope of the claims.

Example 1

Preparation of the Nanomaterials

The following chemicals were used for the preparations: calcium isopropoxide, tetrapropylammonium hydroxide, diammonium hydrogen orthophosphate, zirconium propoxide, propanol, chloroplatinic acid ($H_2PtCl_6$), m-nitroaniline, triethanolamine, and nitric acid. All chemicals were used as received without further purification.

The sol-gel method was employed to prepare $ZrO_2$ hollow nanospheres. In this procedure, 12.0 g of tetrapropylammonium hydroxide (TPAOH) was dissolved in a mixture of 50 mL of distilled water, 20 mL of propanol and 0.05 g of 1M $HNO_3$. To this mixture, 40.0 g of zirconium propoxide was added. After stirring for 60 minutes at room temperature, the mixture was left to stand until the formation of a gel. The gel was then dried using a supercritical drying method employing an autoclave to produce a high surface area of zirconia.

The sol-gel method was also employed for the preparation of Pt—$ZrO_2$ hollow nanospheres. In this procedure, 12.0 g of tetrapropylammonium hydroxide (TPAOH) was dissolved in a mixture of 50 mL of distilled water, 20 mL propanol and 0.05 g of 1M $HNO_3$. To this mixture, 40.0 g of zirconium propoxide and 1.5 g of chloroplatinic acid $H_2PtCl_6$ were added. After stirring for 60 minutes at room temperature, the mixture was left to stand until the formation of a gel. The gel was then dried using a supercritical drying method employing an autoclave to produce high surface area Pt—$ZrO_2$ hollow nanospheres.

The sol-gel method was also employed to prepare hydroxyapatite (HAP) nanoparticles. In this procedure, 12.0 g of tetrapropylammonium hydroxide (TPAOH) was dissolved in a mixture of 50 mL of distilled water and 20 mL propanol. To this mixture, 20.0 g of calcium isopropoxide and 13.0 g of diammonium hydrogen orthophosphate were added. After stirring for 60 minutes at room temperature, the mixture was left to stand until the formation of a gel. The gel was then calcined in air for 5 hours at 550° C.

To prepare Pt—$ZrO_2$—HAP nanocomposites 12.0 g of tetrapropylammonium hydroxide (TPAOH) was dissolved in a mixture of 50 mL of distilled water, 20 mL propanol and 0.05 g of 1M $HNO_3$. To this mixture, 40.0 g of zirconium propoxide and 1.5 g of chloroplatinic acid $H_2PtCl_6$ were added. Subsequently, 30.6 g of hydroxyapatite was dispersed in n-hexane and added to the mixture. After stirring for 120 minutes at room temperature, the mixture was left to stand until the formation of a gel. The gel was then dried using a supercritical drying method employing an autoclave to produce the Pt—$ZrO_2$—HAP hollow nanospheres.

Example 2

Characterization of the Prepared Nanomaterials

A Bruker axis D8 X-ray diffraction (XRD) system was used to observe the crystalline phase of the nanocomposites. XRD was observed employing Cu Kα radiation (λ=1.540 Å) at room temperature. FIG. 1 shows the XRD patterns of hydroxyapatite (HAP), $ZrO_2$, Pt—$ZrO_2$, and Pt—$ZrO_2$—HAP. The crystalline nature of the HAP was confirmed by the reflections observed at 2θ values of 25.8°, 31.7°, 32.17°, 33.0°, 39.8°, 46.6°, and 49.5° (Joint Committee on Powder Diffraction Standards, JCPDS cards 74-565). The structural characteristics of the prepared $ZrO_2$, Pt—$ZrO_2$, and Pt—$ZrO_2$—HAP nanomaterials compare favorably to $ZrO_2$ (JCPDS: 05-0543). This indicates that the $ZrO_2$ structure was preserved after the addition of Pt and hydroxyapatite. Additionally, no diffraction peaks of platinum or platinum oxide in the patterns of the Pt—$ZrO_2$ and Pt—$ZrO_2$—HAP samples were observed. This may be attributed to the low level of Pt doping content. Furthermore, the data implies that Pt is well dispersed within the Pt—$ZrO_2$ and Pt—$ZrO_2$—HAP samples. A small right shift for characteristic peaks of $ZrO_2$ in the Pt—$ZrO_2$ and Pt—$ZrO_2$—HAP samples was observed, which suggests incorporation of some of Pt into the $ZrO_2$ structure.

Figure 2:
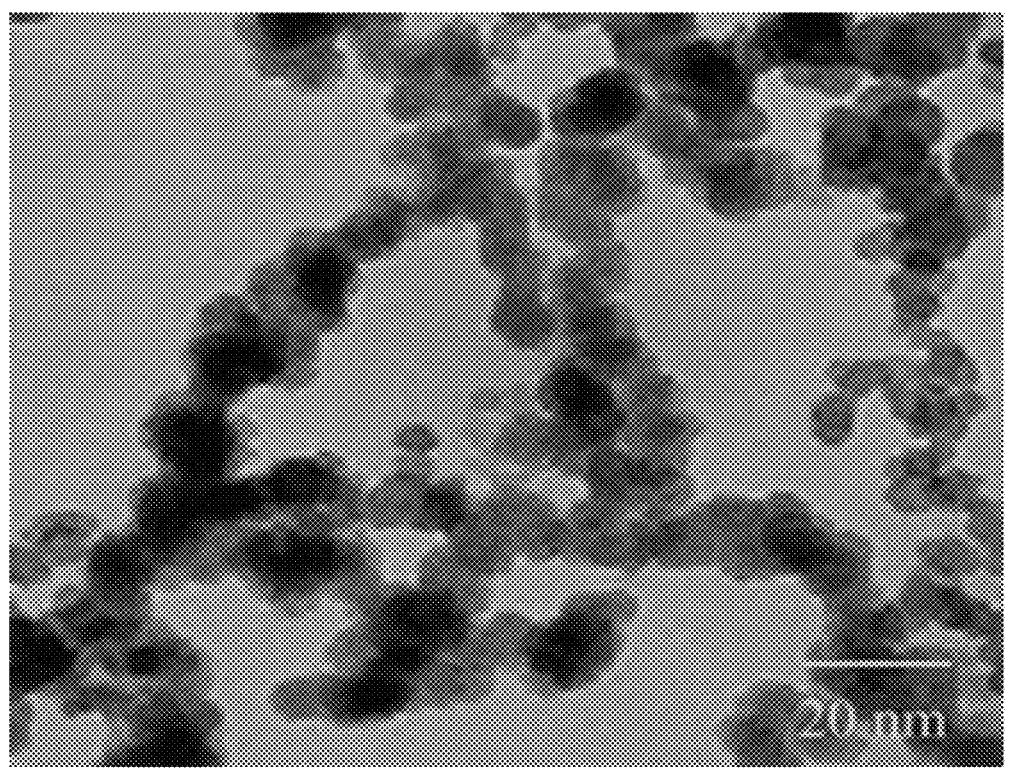
FIG. 2 is a transmission electron microscopy (TEM) image of hydroxyapatite (HAP).
Figure 3:
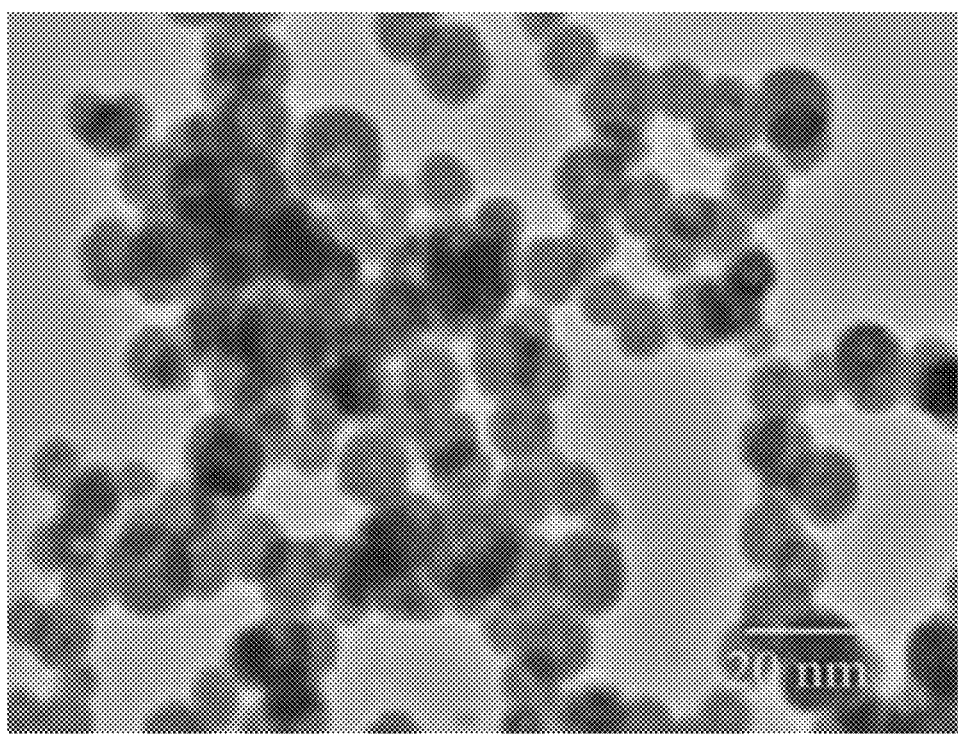
FIG. 3 is a TEM image of zirconia ($ZrO_2$).
Figure 4:
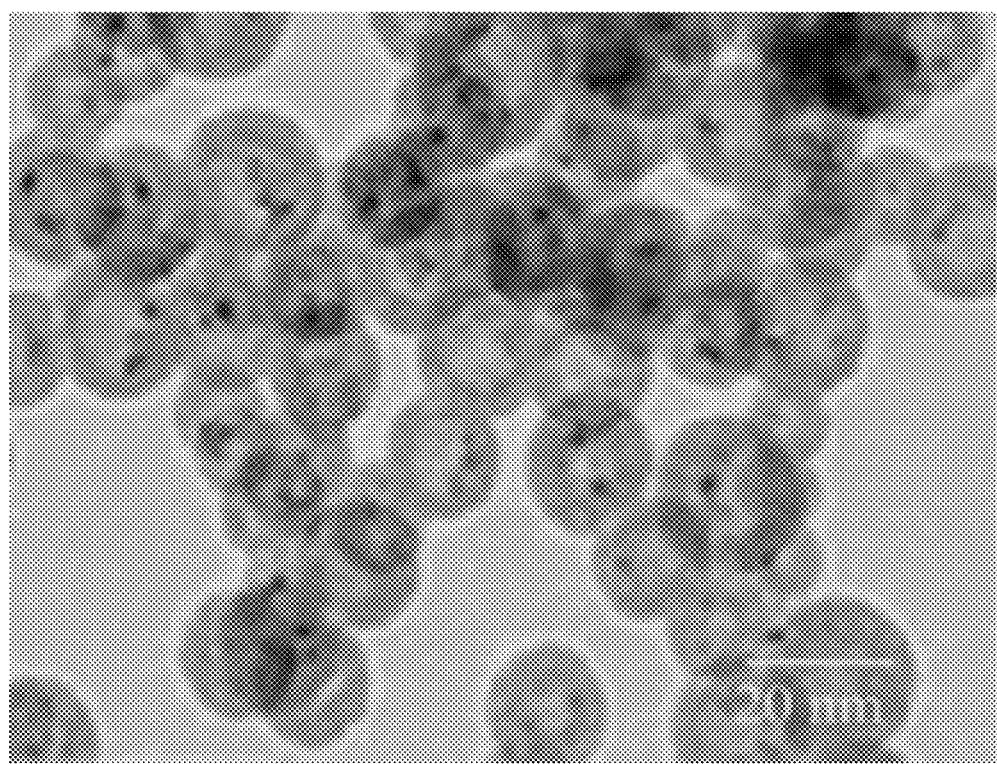
FIG. 4 is a TEM image of platinum-modified zirconia (Pt—$ZrO_2$).
Figure 5:
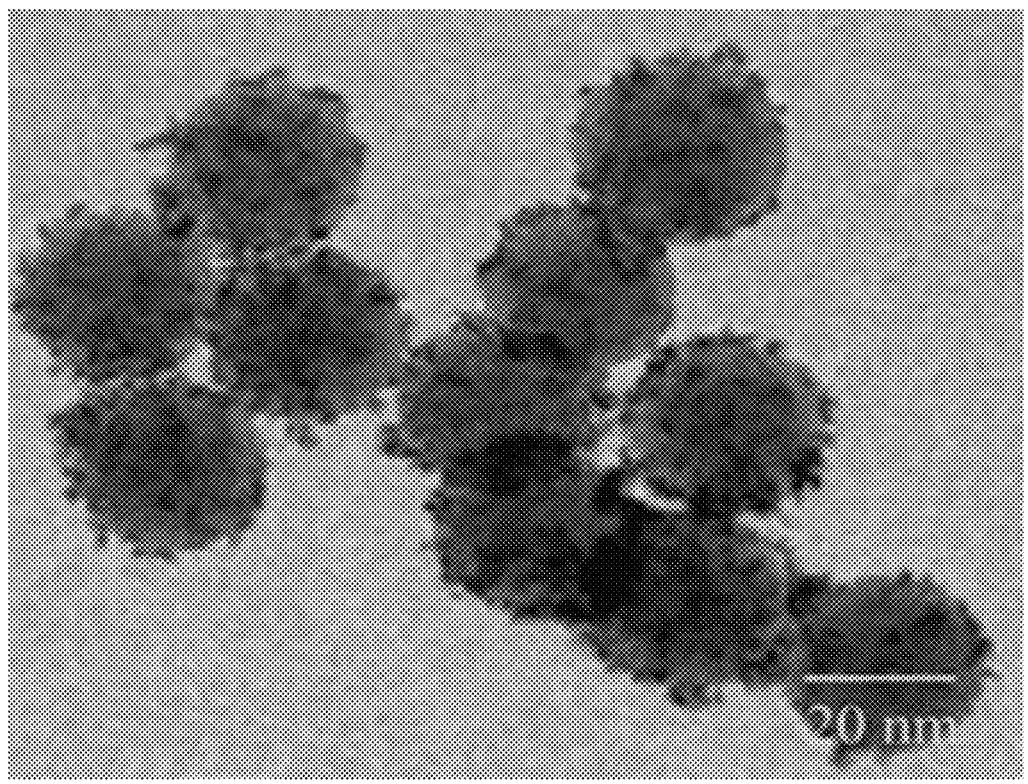
FIG. 5 is a TEM image of platinum/hydroxyapatite modified zirconia (Pt—$ZrO_2$—HAP).

A JEOL-JEM-1230 transmission electron microscope (TEM) was used to obtain the morphology and sample dimensions of the prepared materials. To obtain the TEM images, samples were ultrasonicated for 30 minutes after suspension in ethanol. A small portion of the suspended sample was dried on a carbon-coated copper grid and loaded into the spectrometer. FIG. 2 shows a TEM image of the hydroxyapatite (HAP) sample. FIG. 3 shows a TEM image of the $ZrO_2$ sample. FIG. 4 shows a TEM image of the Pt—$ZrO_2$ sample. FIG. 5 shows a TEM image of the Pt—$ZrO_2$—HAP sample. The HAP sample consists of solid nanoparticles with a size of 10 nm. However, the Pt—$ZrO_2$ and Pt—$ZrO_2$—HAP samples are hollow and spherical in shape. FIG. 4 shows the Pt doping on the surface of the $ZrO_2$ hollow nanospheres. FIG. 5 shows the Pt and HAP doping on the surface of the $ZrO_2$ hollow nanospheres.

Figure 6:
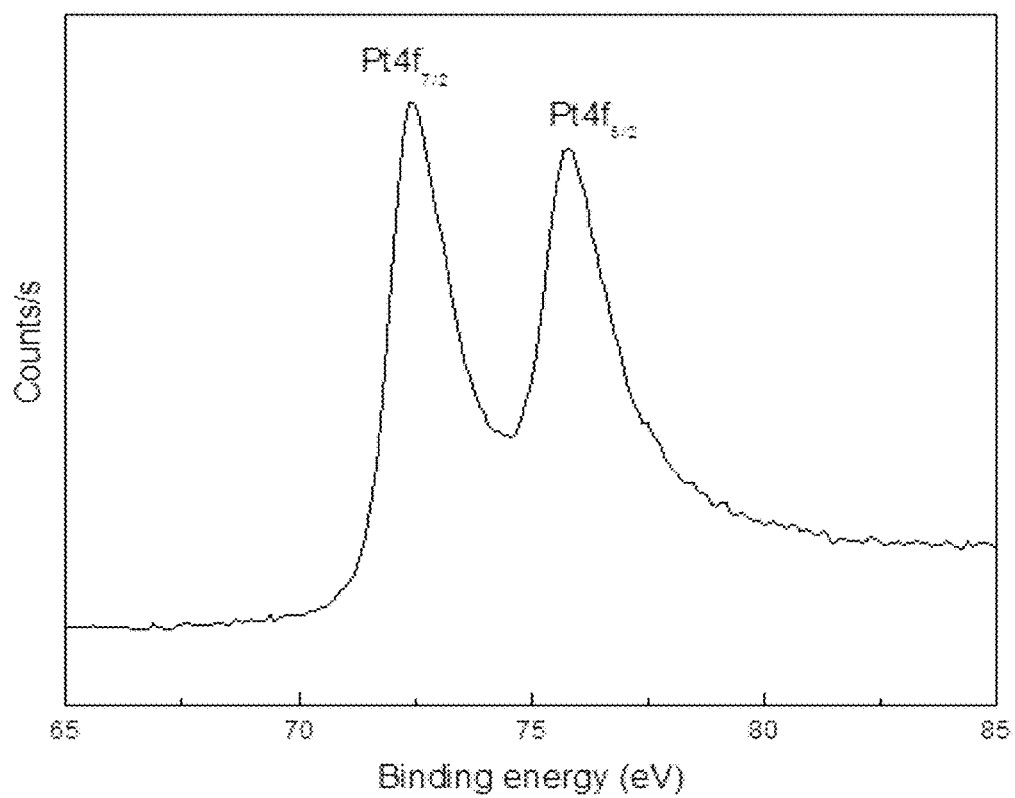
FIG. 6 is an X-ray photoelectron spectroscopy (XPS) spectrum of Pt4f orbitals of platinum species in platinum/hydroxyapatite modified zirconia (Pt—$ZrO_2$—HAP).

A Thermo-Scientific K-ALPHA spectrometer was used to obtain X-ray photoelectron spectroscopy (XPS) measurements. FIG. 6 shows an XPS spectrum of Pt4f orbitals of Pt species in the Pt—$ZrO_2$—HAP sample. The presence of two binding peaks for $Pt4f_{7/2}$ and $Pt4f_{5/2}$ at 72.4 eV and 75.5 eV indicates that the platinum ion is $Pt^2$, which is in agreement with the observation in the XRD patterns. This indicates that platinum may be incorporated into $ZrO_2$ in the form of oxide.

Figure 7:
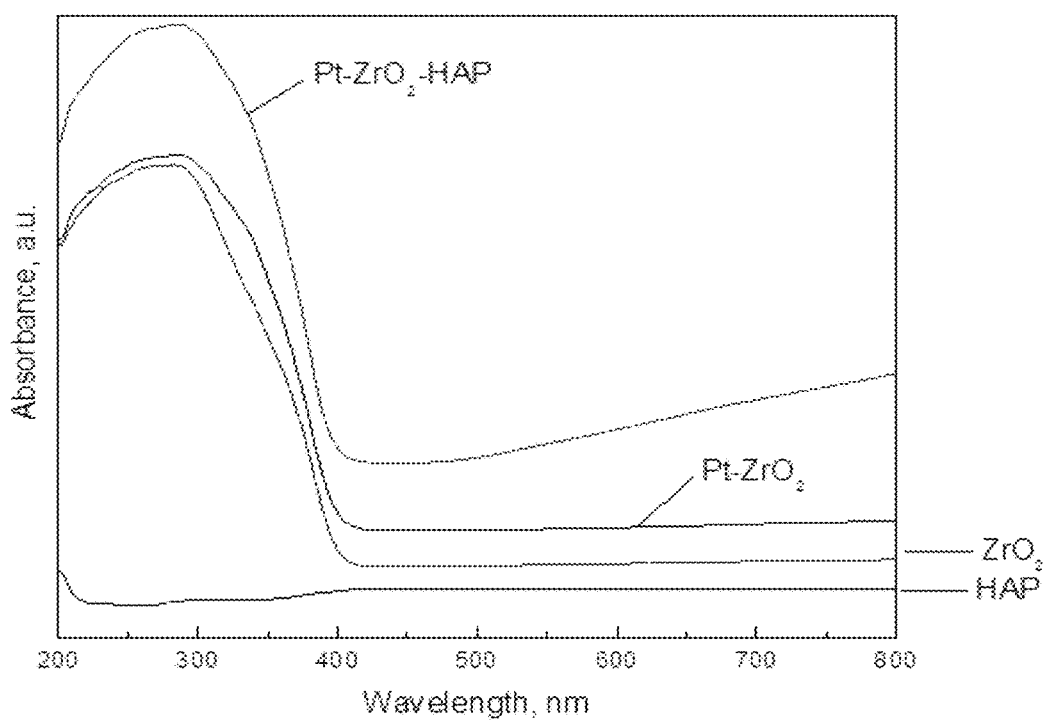
FIG. 7 shows the ultraviolet-visible (UV-Vis) absorption spectra of hydroxyapatite (HAP), zirconia ($ZrO_2$), platinum-modified zirconia (Pt—$ZrO_2$) and platinum/hydroxyapatite modified zirconia (Pt—$ZrO_2$—HAP).

A UV-Vis-NIR spectrophotometer (V-570, Jasco, Japan) was used to get ultraviolet-visible diffuse reflectance spectra (UV-Vis-DRS). These spectra were observed at room temperature over the absorption range of 200-800 nm. Band gap performance was determined from the observed UV-Vis-DRS. FIG. 7 shows the UV-Vis spectra of the HAP, $ZrO_2$, Pt—$ZrO_2$, and Pt—$ZrO_2$—HAP samples. The spectra show that HAP has no absorption in the range of λ=200-800 nm and ZrO2 has an absorption edge at 421 nm. The addition of Pt to $ZrO_2$ hollow nanospheres results in a shift of the absorption edge of $ZrO_2$ from 421 to 431 nm. Furthermore, the shift is greater in the case of addition of Pt and HAP to $ZrO_2$ hollow nanospheres. The values of band gap energies as calculated from the UV-Vis spectra of the $ZrO_2$, Pt—$ZrO_2$, and Pt—$ZrO_2$—HAP samples are 2.95 eV, 2.87 eV, and 2.79 eV respectively.

Figure 8:
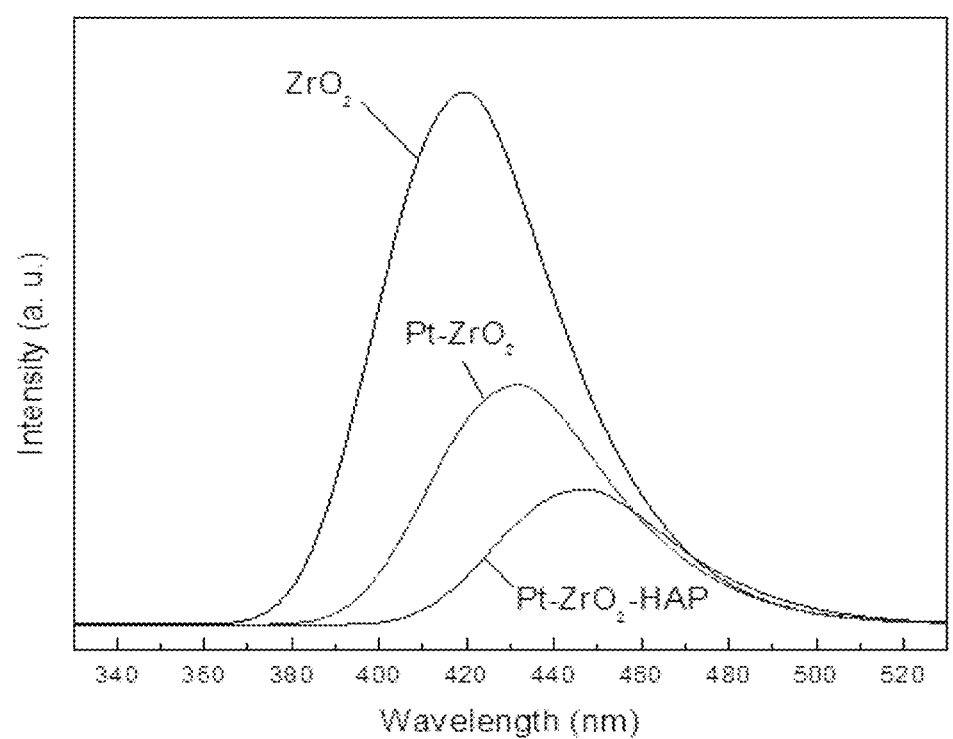
FIG. 8 shows the photoluminescence (PL) emission spectra of zirconia ($ZrO_2$), platinum-modified zirconia (Pt—$ZrO_2$) and platinum/hydroxyapatite modified zirconia (Pt—$ZrO_2$—HAP).

A Shimadzu RF-5301 fluorescence spectrophotometer was used to record photoluminescence (PL) emission spectra. FIG. 8 shows the PL spectra of the $ZrO_2$, Pt—$ZrO_2$, and Pt—$ZrO_2$—HAP samples. The $ZrO_2$ sample shows a high PL peak intensity and addition of Pt to the $ZrO_2$ hollow nanospheres decreases the PL peak intensity. Furthermore, the decrease in the case of the addition of both Pt and HAP to the $ZrO_2$ hollow nanospheres is greater than that of addition of Pt only to the $ZrO_2$ hollow nanospheres. The values of band gap energies of the $ZrO_2$, Pt—$ZrO_2$, and Pt—$ZrO_2$—HAP samples as calculated from the PL emission spectra are 2.94, 2.87, and 2.78, respectively. These values are very close to those obtained from the UV-Vis spectra.

Figure 9:
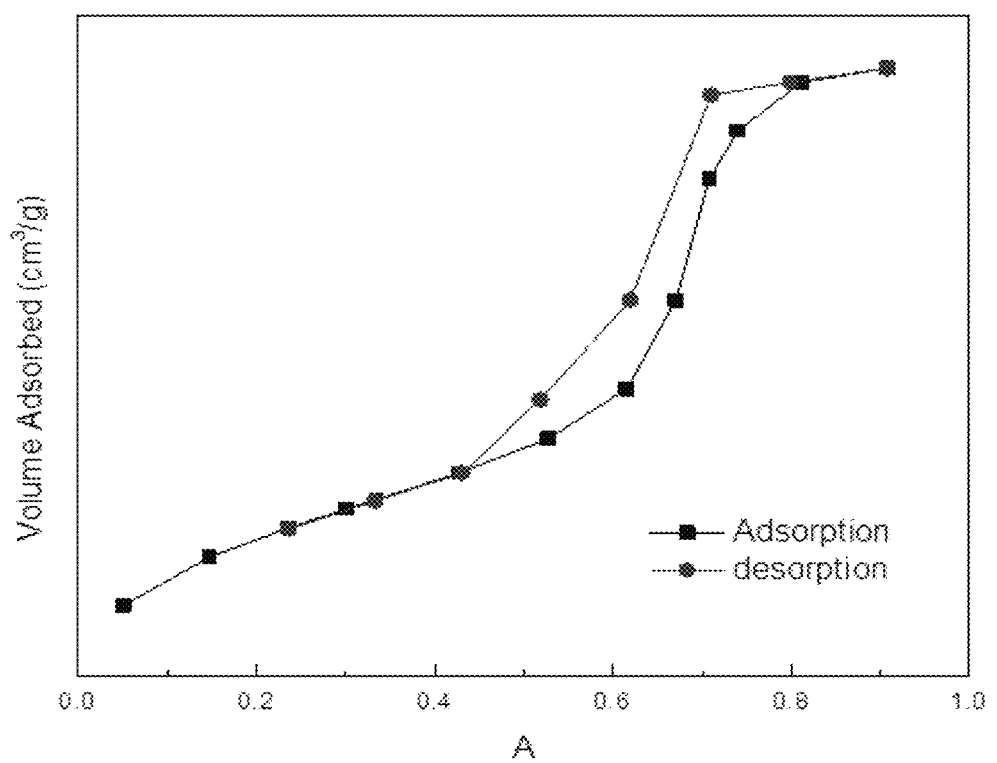
FIG. 9 is the $N_2$ adsorption-desorption isotherms of zirconia ($ZrO_2$).
Figure 10:
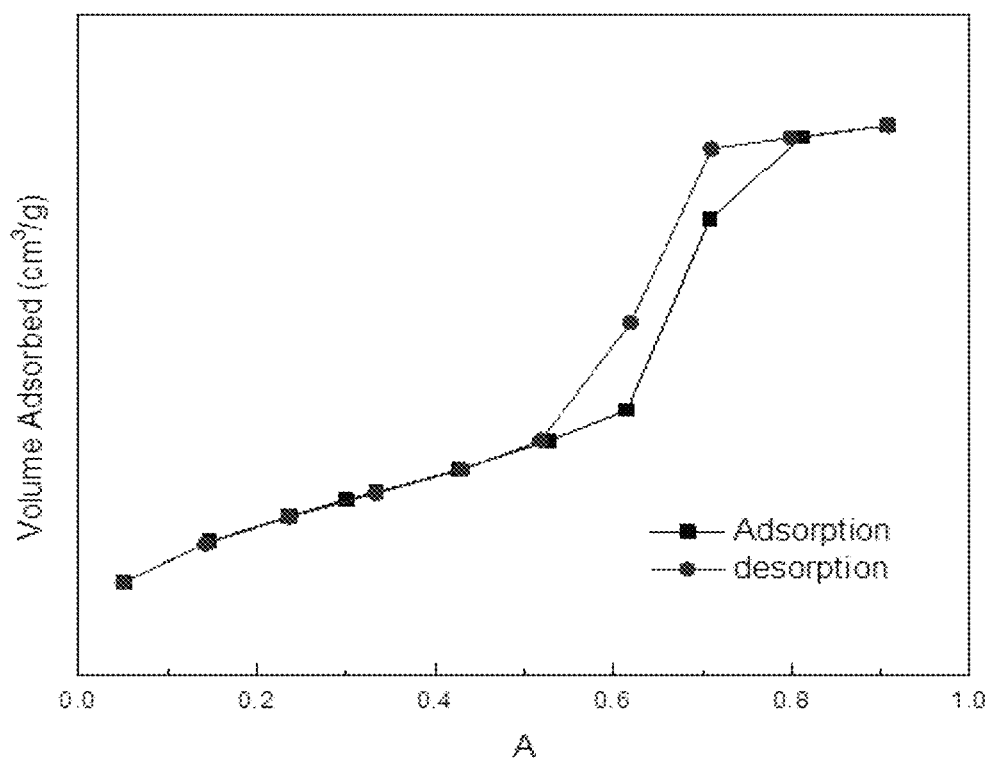
FIG. 10 shows the $N_2$ adsorption-desorption isotherms of platinum-modified zirconia (Pt—$ZrO_2$).
Figure 11:
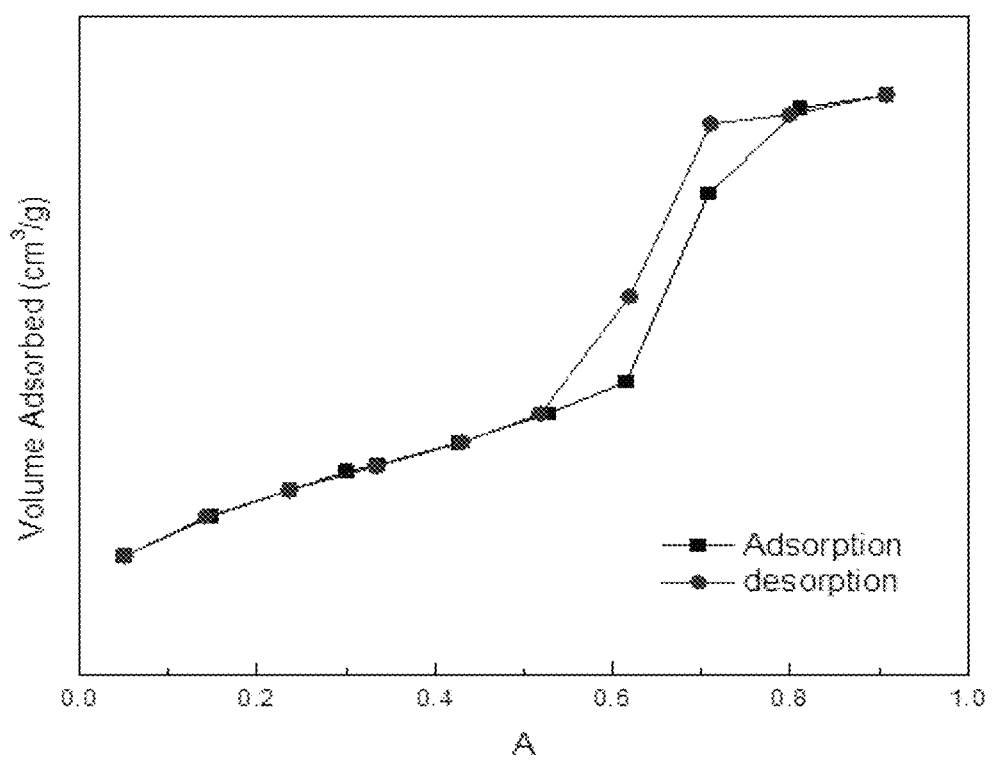
FIG. 11 shows the $N_2$ adsorption-desorption isotherms of platinum/hydroxyapatite modified zirconia (Pt—$ZrO_2$—HAP).
Figure 12:
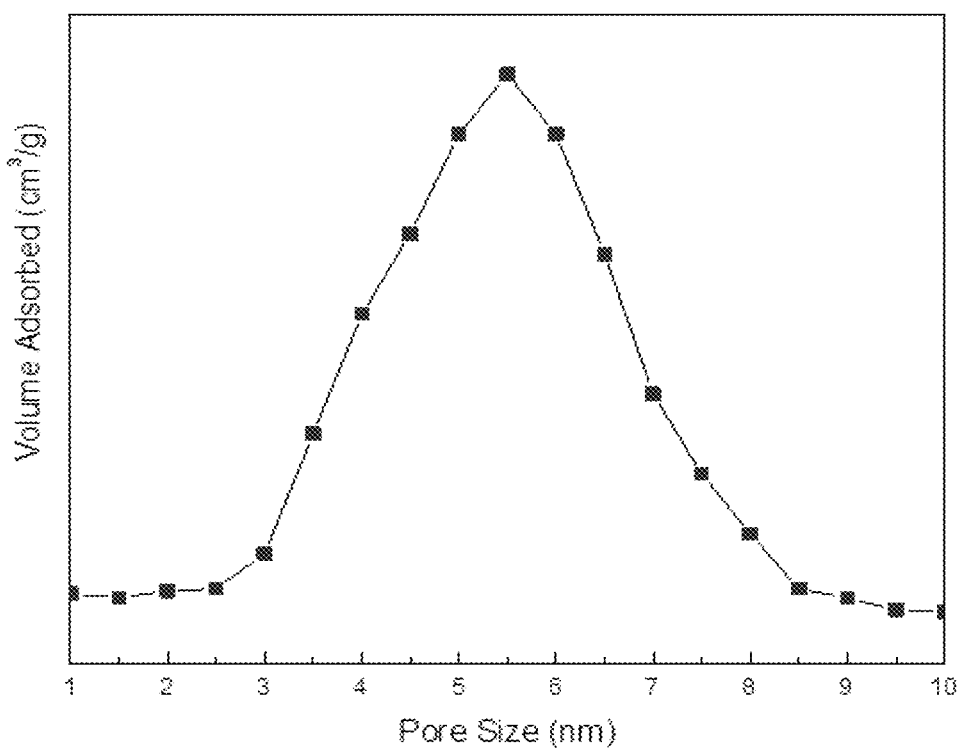
FIG. 12 is a plot illustrating the pore-size distribution of the platinum/hydroxyapatite modified zirconi a (Pt—$ZrO_2$—HAP) nanom ateri al.

The surface area was calculated from $N_2$-adsorption measurements of samples using a Nova 2000 series Chromatech apparatus at 77 K. Samples were heated at 100° C. under vacuum for 2 hours to complete this measurement. FIG. 9 shows the adsorption-desorption isotherm of the $ZrO_2$ sample. FIG. 10 shows the adsorption-desorption isotherm of the Pt—$ZrO_2$ sample. FIG. 11 shows the adsorption-desorption isotherm of the Pt—$ZrO_2$—HAP sample. A type IV isotherm was observed for all samples which indicates that the $ZrO_2$, Pt—$ZrO_2$, and Pt—$ZrO_2$—HAP nanomaterial samples are mesoporous materials. FIG. 12 shows the pore-size distribution of the Pt—$ZrO_2$—HAP sample. A narrow distribution of pore size around 2.7 nm is noticeable. This suggests why the hollow spherical structure has a high surface area. The values of the specific surface area of the $ZrO_2$, Pt—$ZrO_2$, and Pt—$ZrO_2$—HAP samples as calculated from the desorption measurements are 250 $m^2$/g, 270 $m^2$/g, and 350 $m^2$/g, respectively.

Example 3

Photocatalytic Performance of the Prepared Nanomaterials

In photocatalytic tests, a Xenon lamp, of 300 W power and 0.96 W/$cm^2$ intensity with a cutoff filter of 420 nm was used to study the photocatalytic activity of the prepared nanomaterials in the preparation of m-phenylenediamine from the reduction of m-nitroaniline (m-NA). The photocatalyst nanomaterials were suspended in an aqueous solution of m-nitroaniline (20 ppm, 80 mL volume of solution) in a 100 mL reactor. Subsequently, triethanolamine was added as a hole scavenger and the obtained mixture was stirred for 30 minutes in the dark. Oxygen was eliminated from the reaction mixture by nitrogen gas bubbling at a flow rate of 60 mL/min. Aliquots of 4 mL from the mixture were taken and filtered for analysis at various intervals. The analysis was performed with an Agilent 1100 HPLC employing a 0.75 mL/min flow rate, a μBondapak C18 10 μm 125 A 4.6×300 mm column, a water/methanol (50:50) mobile phase and a 254 nm photo diode array (PDA) detector.

Figure 13:
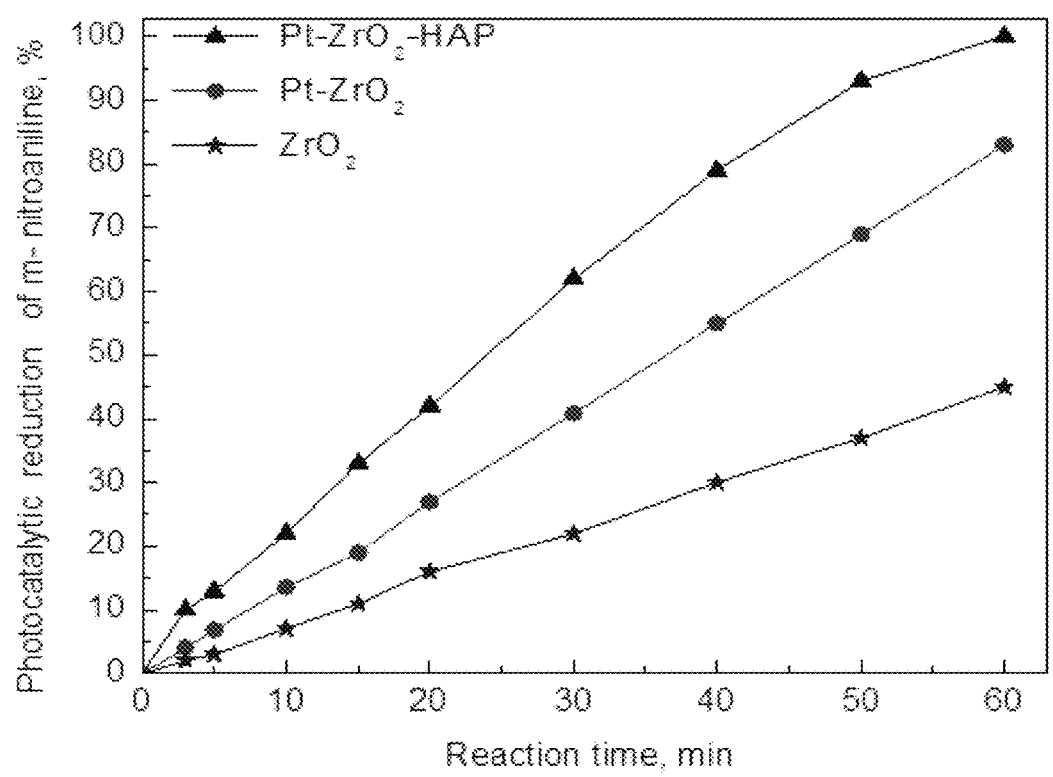
FIG. 13 is a comparative plot illustrating photocatalytic conversion of m-nitroaniline to m-phenylenediamine in the presence of a zirconia ($ZrO_2$) photocatalyst, a platinum-modified zirconia (Pt—$ZrO_2$) photocatalyst, and a platinum/hydroxyapatite modified zirconia (Pt—$ZrO_2$—HAP) photocatalyst.

As previously described, the conversion of m-nitroaniline to m-phenylenediamine was utilized as a reaction to test the synthesized photocatalyst nanomaterials. A comparison between the various prepared nanomaterial structures was performed. FIG. 13 shows the effect of the type of photocatalyst on the conversion of m-nitroaniline to m-phenylenediamine. The photocatalytic conversion of m-nitroaniline to m-phenylenediamine with the use of $ZrO_2$ is small (45%), this can be explained by the fact that $ZrO_2$ has a wide band gap (2.95 eV) compared to the values of the bad gaps of the Pt—$ZrO_2$ and Pt—$ZrO_2$—HAP samples. The photocatalytic conversion of m-nitroaniline to m-phenylenediamine with the use of Pt—$ZrO_2$ and Pt—$ZrO_2$—HAP was 83% and 100%, respectively. It can be seen that the addition of Pt and HAP increases the photocatalytic conversion of m-nitroaniline to m-phenylenediamine, likely due to the decreased band gap, the increased surface area, and the increase in lifetime of the e-h recombination rate.

Figure 14:
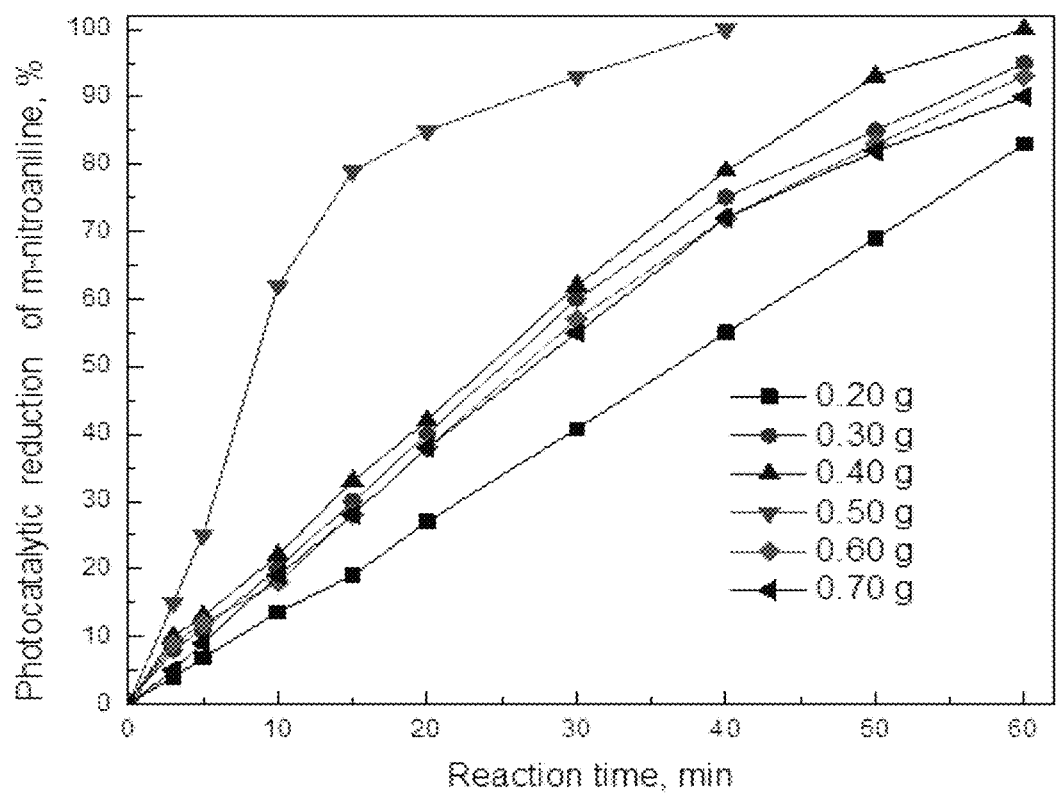
FIG. 14 is a plot illustrating the effect of the platinum/hydroxyapatite modified zirconia (Pt—$ZrO_2$—HAP) photocatalyst dose on the photocatalytic conversion of m-nitroaniline to m-phenylenediamine.

The effect of the amount of added catalyst to the reaction was also evaluated. FIG. 14 shows the effect of the dose of the Pt—$ZrO_2$—HAP photocatalyst on the conversion of m-nitroaniline to m-phenylenediamine. The photocatalytic conversion increased from 83% to 100% by increasing the dose from 0.2 g/L to 0.4 g/L, respectively. The reaction time required for complete conversion of m-nitroaniline to m-phenylenediamine decreased from 60 minutes to 40 minutes by increasing the dose of the Pt—$ZrO_2$—HAP photocatalyst from 0.4 g/L to 0.5 g/L, respectively. This may be due to an increased number of available active sites as a result of the increase in dose of the photocatalyst. When the dose was raised above 0.5 g/L to a value of 0.7 g/L the photocatalytic conversion of m-nitroaniline to m-phenylenediamine decreases from 100% to 90% and the reaction time increases from 40 minutes to 60 minutes. It is possible the higher dose of photocatalyst beyond a certain point may result in a hindering of the penetration of light and the ability of light to reach all available active sites of the photocatalyst.

Figure 15:
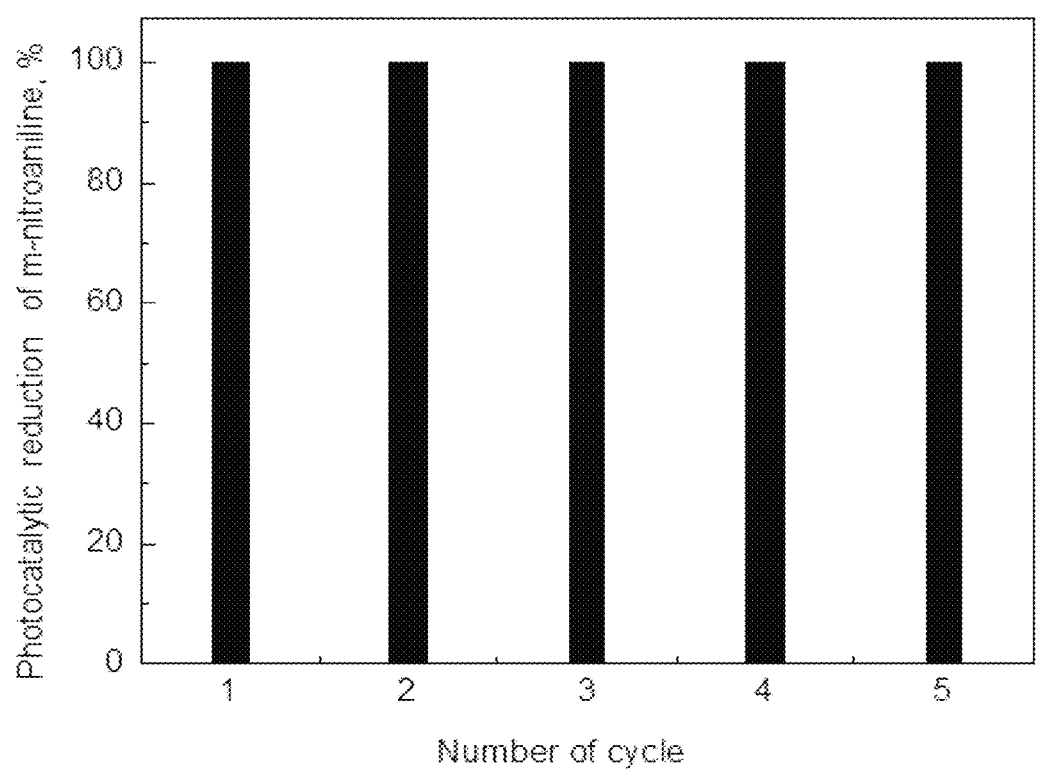
FIG. 15 is a graph illustrating the recycling and reuse ability of the platinum/hydroxyapatite modified zirconia (Pt—$ZrO_2$—HAP) photocatalyst in the photocatalytic conversion of m-nitroaniline to m-phenylenediamine.

Further, an evaluation of the possibility and ability of the catalyst to be reused was also performed. FIG. 15 shows the recycling and reuse of the Pt—$ZrO_2$—HAP photocatalyst and its effectiveness in the conversion of m-nitroaniline to m-phenylenediamine. The data suggests that the conversion remains constant even if the catalyst has been reused for upwards of an additional four reaction runs. Further the data demonstrates the substantial stability of the Pt—$ZrO_2$—HAP photocatalyst.

In conclusion, Pt—$ZrO_2$—HAP nanocomposites with 3 wt % of Pt and 25 wt % of hydroxyapatite were synthesized by a sol-gel method to produce uniform hollow nanospheres. The photocatalytic performance of the nanocomposites was evaluated by the photocatalytic reduction of m-nitroaniline to m-phenylenediamine under visible light. The values of the specific surface area of the prepared $ZrO_2$, Pt—$ZrO_2$, and Pt—$ZrO_2$—HAP samples were 250 $m^2$/g, 270 $m^2$/g, and 350 $m^2$/g, respectively, which demonstrates that the Pt—$ZrO_2$-HAP nanomaterial has a high specific surface area. The shapes of the prepared $ZrO_2$, Pt—$ZrO_2$, and Pt—$ZrO_2$—HAP samples are hollow and nanospherical as determined by transmission electron microscopy (TEM). The photocatalytic performance of the Pt—$ZrO_2$—HAP nanomaterial for the reduction of m-nitroaniline to m-phenylenediamine under visible light is 2.2 times greater and 1.2 times greater than that of $ZrO_2$ and Pt—$ZrO_2$, respectively.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A nanocomposite hollow sphere, comprising:
   a shell surrounding a hollow core, the shell comprising;
      zirconium dioxide;

20-30% by weight hydroxyapatite relative to the total weight of the shell; and
1-5% by weight platinum relative to the total weight of the shell;
wherein an average diameter of the hollow core is in the range of 10-30 nm.

2. The nanocomposite hollow sphere of claim 1, which has a band gap energy of less than 2.9 eV.

3. The nanocomposite hollow sphere of claim 1, having a shell which is mesoporous with an average pore size in a range of 2-10 nm.

4. The nanocomposite hollow sphere of claim 1, which has a BET surface area in a range of 300-400 $m^2/g$.

5. The nanocomposite hollow sphere of claim 1, which has an average shell thickness in a range of 0.1-5.0 nm.

6. The nanocomposite hollow sphere of claim 1, wherein the shell comprises 24-26% by weight hydroxyapatite relative to the total weight of the shell and 2-4% by weight platinum relative to the total weight of the shell.

7. A method for producing the nanocomposite hollow sphere of claim 1, the method comprising:
dissolving an organic zirconium salt and a hexachloroplatinate salt in a first solvent comprising an alcohol, a mineral acid, and an ammonium hydroxide base, thereby forming a first mixture;
adding a solution to the first mixture, the solution comprising hydroxyapatite and a second solvent, thereby forming a second mixture; and
heating the second mixture in an autoclave thereby forming the nanocomposite hollow sphere.

8. The method of claim 7, wherein the mineral acid is nitric acid, the ammonium hydroxide base is tetrapropylammonium hydroxide, the hexachloroplatinate salt is chloroplatinic acid, and the organic zirconium salt is zirconium propoxide.

9. The method of claim 7, wherein the molar ratio of the organic zirconium salt to hydroxyapatite in the second mixture is in a range of 1.1:1 to 3:1 and the molar ratio of hydroxyapatite to the hexachloroplatinate salt in the second mixture is in a range of 25:1 to 1:1.

10. The method of claim 7, wherein the ammonium hydroxide base is present in a molar excess relative to the mineral acid.

11. The method of claim 7, wherein the first solvent is a mixture comprising water and propanol with a volume ratio of water to propanol in a range of 5:1 to 1:1 and the second solvent is n-hexane.

12. A method for reducing an aromatic nitro compound to an aromatic amine compound, the method comprising:
contacting the aromatic nitro compound with the nanocomposite hollow sphere of claim 1 in a solvent to form a reaction mixture; and
irradiating the reaction mixture with a light source having a wavelength of 300-800 nm thereby forming the aromatic amine compound.

13. The method of claim 12, wherein the aromatic nitro compound is m-nitroaniline and the aromatic amine compound is m-phenylenediamine.

14. The method of claim 12, which has a photocatalytic conversion of the aromatic nitro compound to the aromatic amine compound of greater than 80%.

15. The method of claim 12, wherein the irradiating is performed in the presence of a hole scavenger and an absence of oxygen.

16. The method of claim 15, wherein the hole scavenger is triethanolamine.

17. The method of claim 12, wherein 0.1-5.0 grams of the nanocomposite hollow sphere is present per liter of the reaction mixture.

18. The method of claim 12, wherein the irradiating is performed at a temperature of 10-70° C. and a pressure of 0.5-2.0 atm for a time period of 1 to 120 minutes.

19. The method of claim 12, further comprising:
recovering the nanocomposite hollow sphere after the aromatic amine compound is formed; and
recycling the recovered nanocomposite hollow sphere in at least two reaction cycles.

20. The method of claim 19, wherein a photocatalytic conversion of the aromatic nitro compound to the aromatic amine compound is reduced by less than 10 percentage points after at least 2 reaction cycles.

* * * * *